(12) United States Patent
Lang et al.

(10) Patent No.: US 9,812,024 B2
(45) Date of Patent: ***Nov. 7, 2017

(54) COLLABORATIVE AND INTERACTIVE LEARNING

(75) Inventors: Richard Lang, Sebastopol, CA (US); Colt Briner, Windsor, CA (US)

(73) Assignee: DEMOCRASOFT, INC., Santa Rosa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/430,655

(22) Filed: Mar. 26, 2012

(65) Prior Publication Data

US 2012/0244505 A1    Sep. 27, 2012

Related U.S. Application Data

(60) Provisional application No. 61/467,910, filed on Mar. 25, 2011.

(51) Int. Cl.
*G09B 3/00*     (2006.01)
*G06F 15/16*    (2006.01)
(Continued)

(52) U.S. Cl.
CPC *G09B 5/06* (2013.01); *G09B 7/00* (2013.01)

(58) Field of Classification Search
CPC .......... G09B 7/07; G09B 7/073; G06Q 10/10; H04L 12/1813
USPC ................ 434/350–352, 365, 323, 362, 322; 455/2.01; 705/319, 326; 725/9; 715/751, 758, 759; 707/608; 709/201, 709/202, 204, 205, 223, 224
See application file for complete search history.

(56) References Cited

U.S. PATENT DOCUMENTS 6,904,263 B2    6/2005   Grudnitski et al.
7,280,991 B1 *  10/2007  Beams et al. ................... 706/46
(Continued)

OTHER PUBLICATIONS

U.S. Appl. No. 13/492,520, Final Office Action mailed Dec. 19, 2012
(Continued)

*Primary Examiner* — Peter Egloff
(74) *Attorney, Agent, or Firm* — Polsinelli LLP

(57) ABSTRACT

The present invention helps generate connected communities of students and educators through access to an increased pool of granular learning resources that benefit from standardization of formats for creating and utilizing individual discussions on individual topics. The present invention also circumvents the complexity of existing repository systems by creating a standard platform format. Because this format is de facto implemented for any educator using the platform, standardized question types (e.g., discussion types or topic types) become functionally interchangeable notwithstanding any particular individuals utilizing the invention. The interchangeability of individual topics allows for creation of a global "topic library," which may be made available to any educator using the system. This global topic library contains the standardized questions or discussion topics thereby allowing for quick review, selection, and incorporation into the individual teaching environment of any teacher utilizing the invention.

20 Claims, 7 Drawing Sheets

(51) Int. Cl.
*G09B 5/06* (2006.01)
*G09B 7/00* (2006.01)

(52) U.S. Cl.
USPC .......................................... 434/350; 709/204

(56) References Cited

U.S. PATENT DOCUMENTS

| | | | |
|---|---|---|---|
| 7,634,546 B1* | 12/2009 | Strickholm et al. | 709/207 |
| 8,787,819 B2 | 7/2014 | Lang | |
| 2002/0038233 A1 | 3/2002 | Shubov et al. | |
| 2007/0020602 A1 | 1/2007 | Torrance et al. | |
| 2009/0144808 A1 | 6/2009 | Dhananjaya | |
| 2010/0151431 A1 | 6/2010 | Miller | |
| 2011/0055403 A1* | 3/2011 | Balachandran et al. | 709/227 |
| 2011/0289142 A1* | 11/2011 | Whalin et al. | 709/203 |
| 2011/0289433 A1* | 11/2011 | Whalin et al. | 715/753 |
| 2012/0244506 A1 | 9/2012 | Lang | |
| 2014/0356840 A1 | 12/2014 | Lang | |

OTHER PUBLICATIONS

U.S. Appl. No. 13/492,520, Office Action mailed Sep. 6, 2012.
U.S. Appl. No. 13/492,520; Office Action mailed Oct. 7, 2013.
U.S. Appl. No. 13/492,520 Office Action dated Oct. 7, 2013.
U.S. Appl. No. 13/492,520 Final Office Action dated Dec. 19, 2012.
U.S. Appl. No. 13/492,520 Office Action dated Sep. 6, 2012.
U.S. Appl. No. 14/337,207 Office Action dated Sep. 9, 2016.

* cited by examiner ms. tucker | Collaboration Classroom
Public Demonstration Site Start a Discussion | Comment & Vote | Results & Resources Welcome to Ms. Tuckers Collaboration Classroom Public Demonstration Site

| Topic | Popularity |
|---|---|
| On the Pulse of the Morning: Analysis | 240 |
| Should the United States be a leader in the quest to reduce global carbon emissions? | 215 |
| Which factor affecting global warming is most important? | 175 |
| Creative Solutions to Global Warming | 150 |
| Compare Articles: "Chinese Mothers are Superior" to "Tiger Mothers Leave Life Long Scars" | 145 |
| Banished is to hailed as... | 130 |
| Shorewood Lip Dup: Can Windsor High School generate this level of school spirit on our campus? | 100 |
| What can YOU do to positively impact climate change? | 100 |
| Prokaryote Cell? | 90 |
| Peninsular Campaign: Napoleon Invades Russia | 75 |

FIG. 3

Select Your Question or Discussion Type:
 Yes or No        Students vote yes or no on a topic then justify their position
 Multiple Choice   Students select from two or more options and explain their choice
 Vote or Suggest   Students suggest an answer or vote for another student's response.
 Forum             Students respond to a question or reflect on a topic
*FIG. 5*

400
COLLABORATIVE AND INTERACTIVE LEARNING

CROSS-REFERENCE TO RELATED APPLICATION

This application claims the priority benefit of U.S. provisional application No. 61/467,910 filed on Mar. 25, 2011 and entitled "Collaborative and Interactive Learning." The disclosure of the aforementioned application is incorporated herein by reference.

BACKGROUND OF THE INVENTION

Field of the Invention

The present invention generally concerns on-line learning. More specifically, the present invention concerning on-line learning while allowing for interaction and collaboration amongst participants including students and teachers.

Description of the Related Art

On-line and distance learning are becoming increasingly common, especially with increased network bandwidth and the quality of on-line video and audio presentation.

While educators are now able to present high quality content to interested parties without technical distractions related to network interruptions or poor video and sound quality, these presentations are, by and large, static lectures. While these lectures might be informative, they are not engaging, which leads to a lack of attention from an audience, captive or otherwise.

FIG. 1 illustrates a one teacher-to-many students teaching environment as it exists in the prior art. The traditional one teacher-to-many students educational or presentation paradigm shown in FIG. 1 presents a number of obstacles. Students, for example, may feel isolated. There is also a single learning resource (i.e., the teacher) that is forced to divide a finite amount of time and attention to many students. Educational time is also limited with respect to the typical classroom period. For example, certain students (e.g., better performing students or 'class clowns'), may dominate a discussion, which presents a less effective learning environment for other participants. This leads to a poor sense of community and inhibits contribution from the entirety of the classroom.

Further, while there are currently services that serve as repositories of teaching curriculum assembled online from contributing educator), these repositories, and the educators utilizing them, are limited by the fact that each contributing educator submits their own lesson plans or curriculum in a form that differs from other contributors. For example, the approach to the lesson plan and the resources and time needed to execute the plan are inherently different for each individual contribution from an educator. As a result, any educator who wants to draw from the repository must review a multitude of different approaches requiring a multitude of different resources and time to implement.

There is a need in the art for on-line and distance learning while allowing for collaboration amongst participants including students and teachers. There is a further need for a library of content that fosters collaboration and participation with indicia of that content most likely to generate active engagement between participants.

SUMMARY OF THE INVENTION

Embodiments of the present invention allow for a system for collaborative and interactive learning.

BRIEF DESCRIPTION OF THE DRAWINGS

FIG. 3 illustrates an interface for a collaborative learning environment.

FIG. 5 illustrates an interface for selecting a question or discussion type.

DETAILED DESCRIPTION

Embodiments of the present invention allow for on-line and distance learning as well as other group engagements with respect to pre-existing, dynamic, and real-time content. In addition to allowing remote engagement in the learning process, embodiments of the present invention allow for discussions that are a critical part of the learning process. These discussions foster engagement and interaction and drive the educational process to relevant points of detail that are of specific interest to a particular audience. These discussions are also capable of leading to specific conclusions, for example, as a result of "voting" in response to individual questions or discussion topics that can take place within the platform described.

Figure 1:
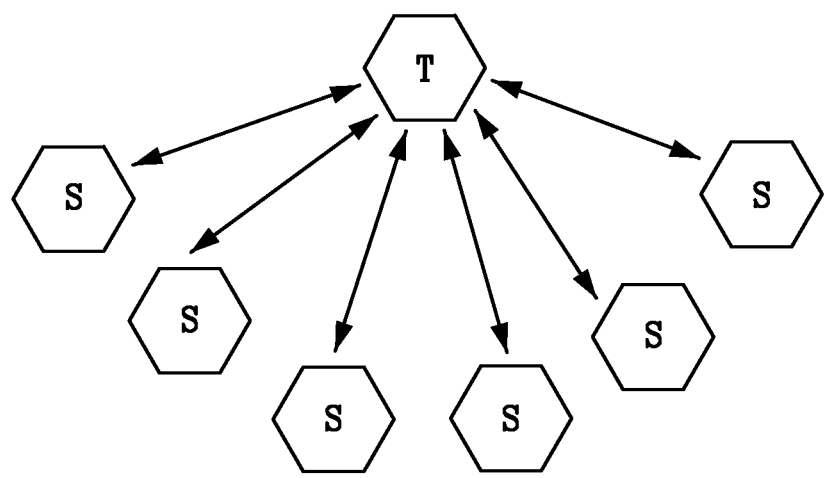
FIG. 1 illustrates a one teacher-to-many students teaching environment as exists in the prior art.
Figure 2:
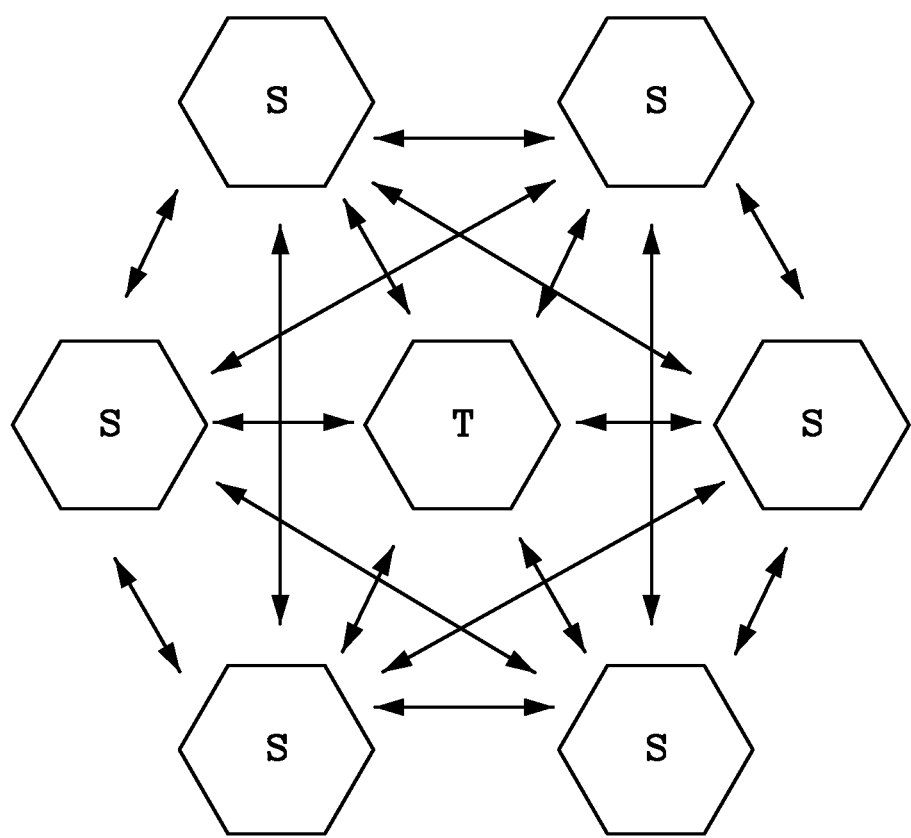
FIG. 2 illustrates an interactive and collaborate learning environment.

These discussions or learning models ideally seek to adopt an interactive and collaborate learning environment like that illustrated in the context of FIG. 2. Embodiments of the present invention, however, differs from a mere chat room in that discussions are structured and kept 'on topic' thereby avoiding off topic discussions, spamming, or flaming that might occur in the context of a typical 'comments' section that one might find following a news story or other generic discussion board. Analysis of these discussions, too, can allow for a determination as to new topics for discussion, topics that do not warrant further discussion, or lectures and overall discussions that might be of interest to third-parties that did not necessarily take place in the discussion at the initial engagement (i.e., a library of interesting content for subsequent third-parties to use).

The learning platform described in the context of the present invention may be implemented by one or more processors that execute instructions stored in one or more memory mediums. Executed code may result in the processors generating and/or providing one or more graphical interfaces. FIG. 3-6 illustrate examples of interfaces used to implement embodiments of the present invention.

As many students already use the Internet for research and other 'homework' related tasks, the present invention easily integrates into a normal student work/study flow and, subject to the limitations of a particular presentation, may allow for on-line access to third-party resources (e.g., websites and multi-media content, as well as libraries of content integrated into the platform) during the course of a discussion and in real-time.

Presenting discussions in real-time and in an on-line environment or platform also allows for more reflective engagement from students as the question or topic is presented in a discussion thread whereas an actual classroom environment might only present the topic in a more ephemeral sense. In the present on-line environment, students may present a question or an answer and review the same before actually submitting the same to a group for consideration or comment. By allowing a student to see their words—and offer the opportunity for editing or reconsideration—more passive students may be more willing to engage in a discussion versus a live and in-person environment where there may be increased peer pressure to say or not say the right thing at the right time.

The platform also benefits teachers in that it allows for the dialogue and discourse of the teacher with the students in both an open and private environment, Some discussions or queries may take place through a private discussion channel with the teacher and one student, or a few students, versus an open channel with all classroom or environment participants. The platform also allows for addressing different interests or topics to sub-groups of students in the context of a common or more unitary discussion whereas offering two near simultaneous lectures to an actual in-person audience would prove more difficult.

The platform also creates, in real-time, an ongoing record of student participation, both as a record of the entire class and as a record of individual activity by individual students. This record of participation enables educators to review contribution and participation levels by individual students (e.g., on a time-stamped basis), thereby aiding educators' ability to subjectively assess the proper grade that any individual student should be awarded for his or her activity on the platform. Individual student participation may be tracked and counted during a particular time period (e.g., daily, weekly, monthly, semester, or quarter) and expressed in various forms such as numerically or as a percentage. A participation record may be displayed or expressed to an educator using any format known in the art such as via a graph, table, chart, or the like.

Educators as well as students may also create forums directed to a particular topic or area of study. In this context, information specific to a particular topic may be presented in a specifically tailored learning environment. This environment may evolve as the discussion takes place over time, or be used for future students or similar lectures or assignments. This environment also exists outside of the traditional classroom or lecture time barriers. While students may still participate or attend a traditional lecture in class, the online learning environment allows for participation without traditional time constraints of the normal classroom day. Educators may solicit (and if appropriate, suppress) contributions from certain students such that it does not disrupt the overall balance of the learning environment.

FIG. 3 illustrates an interface for a collaborative learning environment. The interface may include a list of one or more discussion topics available for participation. A participant may be an educator or student. A participant may select a discussion topic by clicking on a topic of interest.

Through the interface, students can select a particular topic from a particular lecturer or educator in which to participate or become involved. Participants may also start a new discussion or topic by selecting or actuating a "start a new discussion" button or comment on existing topics by selecting a specific topic or by selecting a "comment & vote" button. Participants may also access additional resources related to any one of the identified topics or the educator in general. The interface may also indicate the current status or activity of any particular topic already in progress such as the number of comments or votes associated with a particular discussion of topic, and the popularity of a given topic.

Figure 4:
FIG. 4 illustrates an interface for a participating in a collaborative learning environment for a particular topic.

Once a student or participant selects a given topic, the student enters that particular discussion or interaction environment as illustrated in FIG. 4. FIG. 4 illustrates an interface for a participating in a collaborative learning environment for a particular topic. As shown in FIG. 4, a topic may include text, audio, video, images, animation or other multimedia. Students can provide feedback in response to a particular query posted by a teacher or, if appropriate, another student. Students and participants may vote on a topic and/or provide comments, feedback, and thoughts related to the particular topic.

A further benefit associated with the platform is that an individual question or discussion topic exists as a self-contained learning unit. The question or topic, related description or instructions, related and embedded multimedia or text, student participation (in the form of comments or votes or answers), and results stemming from participant activity within the individual topic, all exist within the self-contained unit. This self-contained and standardized format fosters a more successful and quantifiable exchange between students and teachers as well as between students themselves, and also permits an interchangeability of topics within any individual teacher's platform and between platforms being operated by different teachers with different classrooms.

FIG. 5 illustrates an interface for selecting a question or discussion type. The present invention provides a platform or structure for the development of lectures and other presentations, primarily in the form of individual discussion, question or topic types. By maintaining a uniform structure, various educators or presenters may develop content that may be used by other educators and presenters as well as students and participants without worrying about specific nuances of a particular format such as slide deck versus a word document versus a visual application such as Visio. The learning environment of the present invention thus provides a platform for development of lectures and discussions or interactions on very specific topics, using intuitive interfaces, in the form of "question types" (such as 'Yes/No', 'Multiple-Choice', 'Vote or Suggest', 'Forum'), or any number of other types that operate within the common file types which are accessible and interchangeable within the basic learning platform of the invention.

In order to deliver a consistent interface and interactive environment, a presenter or developer of interactive content, which is inclusive of but not limited to individual topics, discussions or questions, selects a particular discussion or interaction type for the participants or students of the lecture or engaging in the environment. Examples of particular question or discussion types, as shown in FIG. 5, include yes or no questions whereby a participant votes 'yes' or 'no' and then explains the reasoning for their vote. A further example of discussion type as shown in FIG. 5 includes multiple choice whereby a participant selects an answer from a number of presented answers and then explains and/or comments on their particular selection.

A participant may also vote on a pre-existing answer as might have been presented for consideration by the teacher or another student or suggest a new and unique response. Concepts concerning voting and suggesting and implementation of the same are described in patent application Ser. No. 13/309,553, the disclosure of which is incorporated herein by reference. An educator may also present a more generalized forum for discussion of a topic as illustrated in FIG. 5.

Once a discussion type is selected from the options (or other possible options) like those illustrated in FIG. 5, a particular template is presented to allow for the educator to develop their presentation. This template is designed to interact and provide for seamless integration with the overall operating environment of the presently described educational system.

Figure 6:
FIG. 6 illustrates a template for developing a discussion environment.

FIG. 6 illustrates a template for developing a discussion environment. The discussion template of FIG. 6 allows for selection of a particular question or discussion type (as discussed in FIG. 5) as well as the creation of a question or title for the discussion. A description of the topic or more detailed prompt may be provided by the participant or user developing the presentation. The developer of a presentation may select a category of the discussion (e.g., beginner, advanced, honors) and integrate multi-media content and other files. The educator or developer may also set an expiry date for the presentation or discussion whereby users or students are no longer allowed to post comments or interact with the content beyond the expiry date. Through this template driven development process, the curriculum is viewed as content and the topic as a file type universally accessible and capable of being processed by those using the present educational system and environment. The learning environment of the present system effectively operates as a content player.

Figure 7:
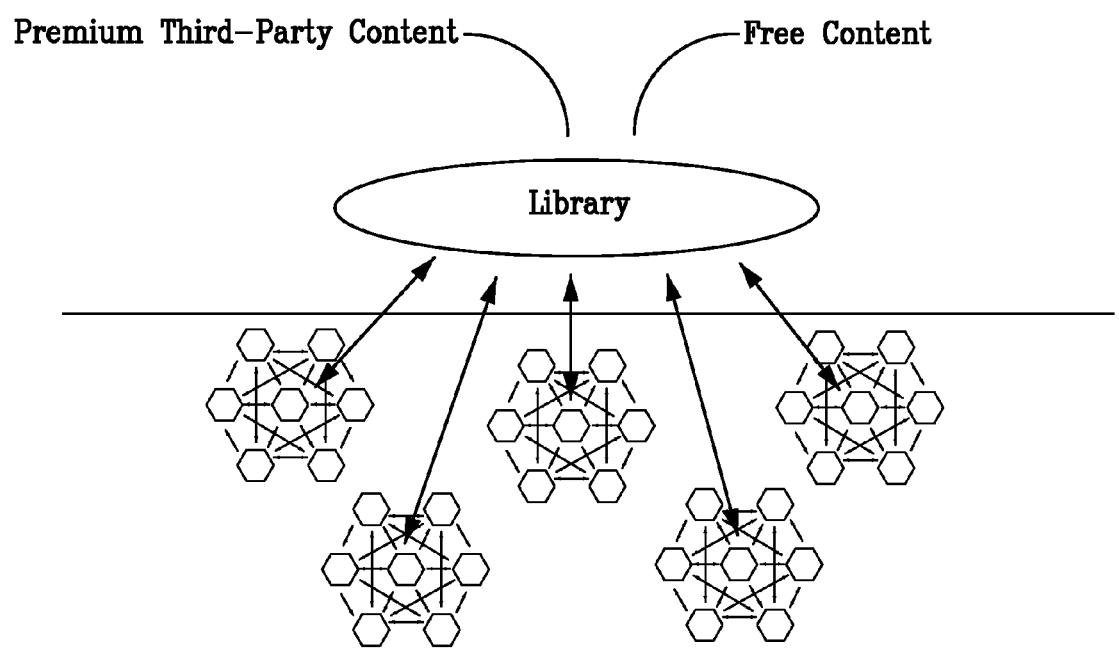
FIG. 7 illustrates a system for generating a library of content in accordance with the present invention.

FIG. 7 illustrates a system for generating a library of content in accordance with the present invention. Once an educator or developer of content completes development of a presentation, that presentation may be uploaded and stored into a library of content for future and/or repeated access. Information about the presentation may likewise be uploaded including user feedback, student comments, and teacher comments (e.g., a report on the relative success or failure of a particular topic within various classroom settings and variables). Content from third-parties (e.g., professional or premium content) or basic "free" content may also be included in the library.

Feedback and other metadata concerning the presentation may be used for analytical studies and to assist educators in selecting the most appropriate "pre-produced" individual discussion or engagement topics that are available in the topic library. In this way, the educational platform develops into an educational ecosystem with an online repository of curriculum created by teachers, for teachers. Topics may be categorized, organized in a multitude of ways, tagged, and shared to make the library searchable by other teachers. Other teachers may then review and comment on the content whereby the best content is made more readily identifiable and available. Teachers may, however, prevent sharing of their content if they do not wish for the content or user comments to become a part of the repository.

The present system also provides an opportunity for educators who have used a particular topic to "rate" that topic in a manner that subsequently provides an ongoing and dynamic "rating" for each topic in the library. As a result of subsequent real-time ratings, a cumulative rating from all teachers or educators who have used that topic in their own classroom environments is generated. This provides an ongoing, real-time, "peer-review" system for all topics in the library of individual topics. The best topics (as well as all relative rankings of all topics) are determined by the actual teachers who have actually used those topics with their own students who are using the platform.

The use of ratings also allows for the identification of individual educators who have contributed topics to the library that other teachers have identified as particularly valuable through the rating process. Teachers may gain in reputation as authors of valuable topics and as prolific authors of valuable topics if they author a multitude of topics that have been highly rated by their peers using those topics from the library of topics. As a result of being identified as authors of highly-rated topics in the topic library, individual educators can be officially recognized by and/or in front of their peers, thus providing an added motivation (peer recognition) for the ongoing creation of topics and the contribution (sharing) of these topics in the topic library. Particular contributors may also be allowed opportunities to monetize their content as provided for by embodiments of the present invention.

The aforementioned embodiments may be monetized, for example, through the use of corporate partners and sponsors with respect to particular environments or learning sites. Embodiments of the present invention may also be implemented in the context of applications to be used on mobile or tablet computing devices. Such applications may be purchased from various 'app stores' that exist to service various platforms (e.g., iOS or Android). Some content may be deemed or designated premium content whereby the use that content by third-parties or the ability to participate as a student may require payment of a fee. Some applications, too, may allow for 'in-environment' or 'in-application' purchases of still further add-ons, features, or other information and content.

The aforementioned embodiments also provide a system whereby an educator, while in the process of creating an individual "topic" (e.g., a discussion, engagement topic, or unit), may want to incorporate various multi-media content provided by "content libraries." These content libraries can be made available to the educators creating topics either at no charge or for a fee. The latter implementation provides an additional monetization option for the operator of the platform being described.

The system described may also includes access to a platform specific "app store," that may operate as an online repository of additional individual functions that can be added to the basic individually utilized platform (as opposed to individual topics) on an a-la-carte, menu-driven basis. The addition of these functions by the educators can be accomplished either by a process of "drag & drop" of icons or other identifiers of specific functions, or through the process of clicking on specific icons or identifiers that describe the individual functions that an educator wished to add to their particular embodiment of the learning platform. These optional or additional functions can be paid for either at the time they are selected or as a result of a credit card or other pre-approved means of payment being associated with the purchaser of the functions.

By inclusion of the content libraries described above, it is possible for content "owners" (e.g., publishers of video, audio, images, text) to monetize their content in an "atomized" form. Instead of relying on the historical monetization and distribution methodologies, which require the marketing and distribution of entire programs, articles, and books via large scale stores or libraries, content providers can offer very small units of their content (e.g., paragraphs instead of chapters; small samples of video instead of the entire programs). This ability to atomize content means that content providers who charge for their content in the aforementioned content libraries can be paid small (or micro) payments multiple times, as their content is utilized in various individual topics being created by individual educators utilizing the platform. Concepts concerning the monetization of atomized content and implementation of the same are described in U.S. patent application Ser. No. 61/529,904, the disclosure of which is incorporated herein by reference.

The above description is illustrative and not restrictive. Many variations of the invention will become apparent to those of skill in the art upon review of this disclosure. While the present invention has been described in connection with a variety of embodiments, these descriptions are not intended to limit the scope of the invention to the particular forms set forth herein. To the contrary, the present descriptions are intended to cover alternatives, modifications, and equivalents as may be included within the spirit and scope of the invention as defined by the appended claims and otherwise appreciated by one of ordinary skill in the art.

What is claimed is:

1. A system for collaborative and interactive learning, the system comprising:
    a server that generates a forum interface for an online learning environment, the server including:
        memory; and
        a processor that executes instructions stored in memory, the instructions executable by the processor to:
            connect a plurality of users for a discussion to the forum interface, wherein the forum interface displays a list of standardized discussion or interaction types to one of the plurality of users,
            receive a selection of a discussion or interaction type from the one of the plurality of users,
            receive at least one written submission from at least one user of the plurality of users, wherein the received submission is in a structured format including quantitative collaborative input elements, is evaluated to ensure that the submission is related to the discussion or interaction type, and is extensible to other users participating in the online learning environment by way of an application executed at a computing device associated with the other users, the structured format associated with the selected discussion or interaction type, and wherein the at least one written submission and the discussion or interaction type form a self- contained learning unit, the self-contained learning unit embeddable in a digital environment,
            display the at least one written submission that is evaluated to be related to the discussion or interaction type on the forum interface, and
            record user activity in real time; and
    a plurality of end-user client devices that are communicatively coupled to the server over a communications network, the plurality of end-user client devices allowing for collaboration and interaction with the server in real time by way of the forum interface.

2. A method for creating a collaborative and interactive discussion platform, the method comprising:
    generating, by way of a server, a forum interface for an online learning environment; and
    executing instructions stored in memory, wherein execution of the instructions by a processor:
        connects a plurality of users for a discussion to the forum interface, wherein the forum interface displays a list of standardized discussion or interaction types to one of the plurality of users,
        receives a selection of a discussion or interaction type from the one of the plurality of users,
        receives at least one written submission from at least one user of the plurality of users, wherein the received submission is in a structured format including quantitative collaborative input elements and is extensible to other users participating in the online learning environment by way of an application executed at a computing device associated with the other users, the structured format associated with the selected discussion or interaction type, and wherein the at least one written submission and the discussion or interaction type form a self-contained learning unit, the self-contained learning unit embeddable in a digital environment,
        displays the at least one written submission on the forum interface, and
        records user activity in real time.

3. The method of claim 2, wherein at least one educator connects to at least one student for the discussion on the forum interface.

4. The method of claim 3, wherein the at least one student transmits the written submission to the at least one educator, and wherein the written submission is a private communication viewable by the at least one student and the at least one educator.

5. The method of claim 3, wherein the at least one student transmits the written submission to the at least one educator, and wherein the written submission is a public communication viewable by each of the plurality of users.

6. The method of claim 2, wherein the plurality of users access third party content via the forum interface in real time during the discussion.

7. The method of claim 2, wherein the forum interface displays a list of at least one discussion topic.

8. The method of claim 2, further comprising organizing the at least one written submission by topic of interest.

9. The method of claim 7, further comprising allowing the plurality of users to submit text, audio, video, images, animation, or other multimedia related to the at least one discussion topic.

10. The method of claim 2, wherein an administrator utilizes the forum interface to develop presentation materials.

11. The method of claim 10, wherein the administrator sets an expiration date beyond which no users may interact with the forum interface.

12. The method of claim 10, further comprising storing presentation materials in a library.

13. The method of claim 12, further comprising permitting other educators to access the library.

14. The method of claim 12, further comprising organizing presentation materials by category.

15. The method of claim 12, further comprising permitting the plurality of users to search the library.

16. The method of claim 13, wherein the other educators provide a rating for the presentation materials.

17. The method of claim 12, wherein the administrator monetizes the presentation materials.

18. A non-transitory computer readable storage medium having embodied thereon instructions, the instructions executable by a processor to perform a method for creating a collaborative discussion platform, the method comprising:
    connecting a plurality of users for a discussion to a forum interface, wherein the forum interface displays a list of standardized discussion or interaction types to one of the plurality of users;
    receiving a selection of a discussion or interaction type from the one of the plurality of users;
    receiving at least one written submission from at least one user of the plurality of users, wherein the received submission is in a structured format including quantitative collaborative input elements, is evaluated to ensure that the submission is related to the discussion or interaction type, and is extensible to other users participating in the online learning environment by way of an application executed at a computing device associated with the other users, the structured format associated with the selected discussion or interaction type, and wherein the at least one written submission and the discussion or interaction type form a self-contained learning unit, the self-contained learning unit embeddable in a digital environment;

displaying the at least one written submission that is evaluated to be related to the discussion or interaction type on the forum interface; and recording user activity in real time.

19. The method of claim 1, further comprising generating additional discussion or interaction type different from the selected discussion or interaction type based on the received submission from the plurality of users.

20. The method of claim 19, wherein the generated additional discussion or interaction type are based on the received submission that were evaluated as being unrelated to the selected discussion or interaction.

\* \* \* \* \*